United States Patent Office 3,806,442
Patented Apr. 23, 1974

3,806,442
SOLVENT DEWAXING OF MINERAL OILS
Lloyd E. Reid and David A. Gudelis, Sarnia, Ontario, Canada, assignors to Esso Research and Engineering Company
No Drawing. Filed Aug. 14, 1972, Ser. No. 280,492
Int. Cl. C10g 43/08
U.S. Cl. 208—33          8 Claims

ABSTRACT OF THE DISCLOSURE

In a process for the separation and removal of wax from petroleum hydrocarbon oils such as distillates, residual bright stocks, and the like, by dissolving the oil in a dewaxing solvent or mixture of solvents, chilling the solution to crystallize or precipitate the wax, separating the dewaxed oil solution from the wax as by centrifugation or filtration, and recovering a solvent-free oil and wax, the improvement comprising: the incorporation into the oil or oil-solvent mixture, prior to or during the chilling operation, of a mixture of: (a) at least two different Ziegler-Natta catalyzed long chain olefins, homopolymers, or an interpolymer comprising at least two different long chain olefins, said olefins being $C_{14}$ to $C_{24}$ "substantially linear" alpha-mono-olefins, or mixtures thereof, and (b) a homopolymer or interpolymer of one or more $C_{10}$ to $C_{24}$ n-alkyl esters of methacrylic acid.

Use of the mixture of the dewaxing aids (a) and (b) can result in the formation of a wax crystal that filters more rapidly and retains less oil than when either component of the mixture is used alone at comparable concentrations.

BACKGROUND OF THE INVENTION

Field of the invention

This invention relates to an additive mixture and its use in a process for the solvent dewaxing of wax-containing mineral oils, petroleum distillates, residual brightstocks and the like. More particularly, the invention is concerned with dewaxing aids which when added to these oils, or oil-solvent mixtures, either prior to or during the chilling operation, results in the formation of a wax-crystal structure which can be separated from the dewaxed oil-solvent mixture, as by filtration or centrifugation, more rapidly and completely than when each of the additives forming the synergistic composition is used alone at the same concentration as the mixture.

Description of the prior art

Virtually all petroleum crude oils contain hydrocarbons which will solidify at ordinary temperatures and are classified as waxes. The wax content of the crude varies with the type and origin. Thus, naphthenic or asphaltic crudes have a minimum wax content, whereas paraffinic crudes may have in excess of 20% by weight of wax. Since waxes present in the crude boil in the same range as lubricating oils prepared from these crudes, the waxes which cause the lubricants to have high pour points cannot be separated by distillation of fractionation.

A variety of methods have been used in the past for separating the wax from oil. These have included chilling the wax-containing oil to the point where the wax precipitates or crystallizes, followed by settling, centrifugation or filtration. Filtration is very slow and the use of solvents during the crystallization and filtration steps has generally supplanted the older non-solvent processes.

In the solvent process, the oil is diluted with a solvent such as propane, or mixed solvents such as: acetone and benzene; or methylethyl ketone and toluene or methyl isobutyl ketone, etc. The mixture is heated with some form of agitation until solution is complete, and then chilled. A slurry is formed containing the wax in crystalline form which is then filtered in leaf, plate and frame or rotary filters. The filtration rate is determined by the size, shape and structure of the crystals formed in the chilling step of the process.

Very fine crystals, which normally retain a minimum of mother liquor, tend to clog the filter medium and necessitate frequent shut down and cleaning, large crystals tend to form gel-like interlocking masses which retain a large amount of the oil and solvent mother liquor, and are difficult to wash.

More recently, it has become the practice in the art to incorporate in the wax-containing petroleum oil from 0.001 to 2.0 wt. percent of materials which modify the wax crystal size, shape and structure in such a manner as to permit more rapid and complete separation of the wax crystals from the dewaxed oil-solvent mother liquor. Typical of the materials which have been used for this purpose are: mixtures of the Friedel-Crafts condensation product of a halogenated hydrocarbon, such as chlorinated paraffin wax, with an aromatic hydrocarbon such as naphthalene as disclosed in British Pats. 511,207 and 562,714 and hereinafter referred to as Paraflow. Paraflow used with a polymeric higher alkyl methacrylate available commercially as Acryloid 150 is disclosed in U.S. Pat. 2,798,027. Mixtures of Paraflow with a polymerized long-chain alkyl 1,2-oxirane is disclosed in U.S. Pat. 3,417,010. Mixtures of Paraflow with polymerized higher fatty esters of vinyl alcohol is disclosed in U.S. Pat. 3,475,321. Incremental addition during chilling, of two dewaxing aids, e.g. Paraflows made from different melting paraffin waxes, is disclosed in U.S. Pat. 3,458,430. A mixture of at least two homopolymers of a $C_{14}$–$C_{24}$ alpha-olefin used alone, or in admixture with Paraflow, is disclosed is copending U.S. patent application S.N. 164,892, filed July 21, 1971, which is herein incorporated by reference.

Summary of the invention

In a dewaxing process for the separation of wax from petroleum oils which includes dissolving the oil in a dewaxing solvent or mixture of solvents, chilling the oil solution to form solid wax crystals and separating the wax from the oil-solvent mother liquor, the improvement of incorporating into the oil or oil-solvent solution prior to or during the chilling operation, either together or individually, a total of from 0.001 to about 2.0 wt. precent, based on oil to be dewaxed, preferably 0.005 to 1.0 wt. percent, more preferably from 0.01 to 0.2 wt. percent, of oil-soluble polymers comprising: (A) at least two Ziegler-Natta catalyzed $C_{14}$ to $C_{24}$ substantailly linear alpha-olefin homopolymers, or interpolymers containing said olefins, and mixtures thereof and (B) a homopolymer of one, or copolymer comprising a major proportion by weight of at least two, $C_{10}$ to $C_{24}$ substantially straight-chain alkyl esters of methacrylic acid. Usually about 10 to 90 parts by weight of polymer (a) will be used per 90 to 10 parts by weight of polymer (b).

In general, the use of the two different polymeric dewaxing aids, i.e. (a) and (b), improves the rate with which wax may be separated from the oil-solvent mother-liquor and yields a wax filter cake containing less oil than when either polymeric dewaxing aid is used alone at the same concentration as the mixture.

Description of preferred embodiments

Polymer A: The preferred dewaxing aids of this invention include as one component Ziegler-Natta catalyzed mineral oil-soluble (i.e. oil soluble at room temperature) polymers having a number average molecular weight in the range of 1,000 to 200,000, preferably 3,000 to 50,000, comprised of a mixture of at least two homopolymers of alpha-olefins in the $C_{14}$ to $C_{24}$ range, more preferably $C_{14}$ to $C_{20}$ range, or interpolymers containing at least 30 weight percent of two unlike alpha-olefins in the $C_{14}$ to $C_{24}$ range, more preferably $C_{14}$ to $C_{20}$ range. An interpolymer comprised of 15 to 35 wt. percent of n-hexadecene-1, 15 to 30 wt. percent of n-octadecene-1, 10 to 20 wt. percent of n-eicosene-1 and 25 to 45 wt. percent of a n-$C_3$ to $C_{12}$ alpha-olefin, e.g. n-hexene-1, is especially preferred.

The $C_{14}$ to $C_{24}$ alpha-monoolefin monomers which are used to prepare the Ziegler-Natta polymeric component of this invention may be represented by the formula: $R-CH=CH_2$, wherein R is a "substantially linear" acyclic saturated hydrocarbon radical having from 12 to 22 carbon atoms. It is preferred that R have the formula: $R'-CH_2(CH_2)_n-CH_2-$, wherein $n$ is an integer in the range of 10 to 20, preferably 12 to 16, and $R'$ is independently selected from the group consisting of hydrogen, $C_1$ to $C_{10}$ straight-chain alkyl radicals, and $C_3$ to $C_{10}$ branched chain akyl radicals having no more than one side chain of one or two carbon atoms. Non-limiting examples of suitable α-olefin monomers include: n-tetradecane-1, n-pentadecene-1, n-hexadecene, n-octadecene-1, n-eicosene-1, 15-methyl hexadecene-1, 16-ethyl octadecene-1, 15-ethyl eicosene-1 and 18-methyl eicosene-1. Accordingly, the term "substantially linear" as used herein denotes those acyclic structures in which alkyl radical R has the structure $R'-CH_2(CH_2)_n-CH_2-$ as defined above. While the terms are familiar to those having skill in the polymer art. The term "homopolymer" means a polymer of a single polymerizable species, and interpolymer as used herein means a randomly distributed polymer comprising at least two polymerizable monomer moieties.

When the polymeric alyha-olefin component of this invention comprises homopolymers, at least two different homopolymers of substantially linear $C_{14}$ to $C_{24}$ alpha-olefins shall be present in the dewaxing aid mixture.

When the polymeric alpha-olefin component of this invention comprises an interpolymer it will contain at least 30 weight percent of two or more different "substantially linear" $C_{14}$ to $C_{24}$ alpha-olefins, most preferably 60 to 100% of alpha-olefins having 16 to 20 carbon atoms. Polymers useful in the practice of this invention may also contain from 0 to 70 weight percent of alpha-olefin comonomers in the range of 3 to 12 carbon atoms. When interpolymerized with two or more substantially linear $C_{14}$ to $C_{24}$ alpha-olefins, economically attractive products may be prepared having high potency as one of the components of the dewaxing aids of this invention.

The $C_3-C_{12}$ alpha-olefins which may be interpolymerized with the $C_{12}-C_{24}$ alpha-olefins may be represented by the general formula: $CH_2=CH-R''$, wherein $R''$ is a hydrocarbon radical of from 1 to 10 carbon atoms. Structurally $R''$ may be aliphatic, cycloaliphatic or aromatic. Non-limiting examples of suitable olefins include: propylene, butene-1, pentene-1, hexene-1, octene-1, decene-1, dodecene-1, vinyl cyclopentane, vinyl cyclohexane, styrene, p-methyl styrene and p-tert. butyl styrene.

Effective interpolymers may also be prepared from $C_5-C_{12}$ type II alicyclic monoolefins and acyclic or alicyclic non-conjugated diolefins. Type II olefins have the structure $R-CH=CH-R$ as defined by Schmidt and Boord, J.A.C.S. 54, 751, 1932. Non-limiting examples of such suitable mono and diolefins include: cyclopentene; cyclohexene; cyclodecene; 1,4-pentadiene; 1,4-hexadiene; 3,7-dimethyl; 1,7-octadiene; 1,4-cyclohexadiene; 4-vinyl cyclohexene; tetrahydroindene; dicyclopentadiene; bicyclo(2,2,1) hepta 2,5-diene; and 5-ethylidene 2-norbornene.

Particularly preferred homopolymers for the practice of this invention are mixtures of two or more different homopolymers of n-tetradecene-1, n-pentadecene-1, n-hexadecene-1, n-heptadecene-1, n-octadecene-1, n-nonadecene-1 and n-eicosene-1, where no one homopolymer accounts for more than 80 weight perecnt, preferably no more than 60 weight percent of the total weight of alpha-olefin homopolymers. A particularly effective mixture comprises from 0 to 70 weight percent (e.g. 40 weight percent) of poly (n-hexadecene-1); 0 to 70 weight percent (e.g. 30 weight percent) of poly(n-octadecene-1); and 0 to 70 weight percent (e.g. 30 weight percent) of poly(n-eicosene-1).

Particularly preferred interpolymers of this invention are comprised of at least two different, "substantially linear" $C_{14}$ to $C_{24}$, preferably $C_{16}$ to $C_{20}$ alpha-monoolefin monomers in which said monomers are present in the interpolymer in a concentration in the range of 30 to 90 weight percent, preferably 30 to 60 weight percent. Of interest is an interpolymer prepared from at least two unlike substantially linear $C_{14}-C_{20}$ alpha-monoolefins, consisting essentially of 0 to 70 wt. percent of n-tetradecene-1, 0 to 70 wt. percent of n-hexadecene-1, 0 to 70 wt. percent of n-octadecene-1, 0 to 70 wt. percent of n-eicosene-1 and 0 to 70 wt. percent of a $C_3$ to $C_{12}$ alpha-monoolefin (e.g. n-hexene-1).

Of particular interest is an interpolymer comprised of 15 to 60, preferably 25 to 45 wt. percent of n-hexene-1; 10 to 50, preferably 15–35 wt. percent of n-hexadecene-1; 10 to 40, preferably 15 to 30 wt. percent of n-octadecene-1; and 5 to 30, preferably 10 to 20 wt. percent of n-eicosene-1.

From the above, the Ziegler-Nata homopolymers and interpolymers comprising one component of this invention may be represented graphically as:

(1) A mixture of at least two homopolymers having the structure:

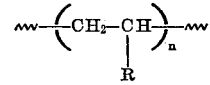

wherein R is independently selected from the group of "substantially linear" $C_{12}$ to $_{22}$ alkyl radicals; $n$ is an integer in the range of about 10 to about 500, and R is different in each of said homopolymers.

(2) Interpolymers having a random distribution of $w$, $x$, $y$ and $z$ moieties having the structure:

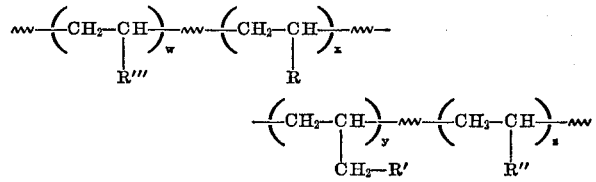

wherein R and R'' are different and independently selected from the group of "substantially linear" $C_{12}$ to $C_{22}$ alkyl radicals; $R'$ is selected from the group consisting of hydrogen, $C_1$ to $C_9$ straight and branched chain alkyl radicals, $C_2$ to $C_9$ straight and branched chain alkylene radicals, $C_5$ to $C_{10}$ cycloalkyl radicals and $C_6$ to $C_{10}$ aryl and alkyl aryl radicals; $R'''$ is selected from the group consisting of $C_6$ to $C_{10}$ aryl and alkyl aryl radicals; and the sum of $x$ and $z$ moieties in said interpolymer is equal to at least 30 wt. percent and the sum of $w$ and $y$ moieties is in the range of 0 to 70 wt. percent.

(3) Interpolymers having a random distribution of $v$, $w$, $x$, $y$ and $z$ moieties having the structure:

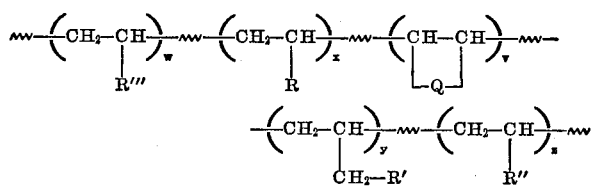

in which R, $R'$, $R''$ and $R'''$ are as in (2) above; Q is a single or multi-ring saturated or unsaturated cyclo hydrocarbon radical; and the sum of $x$ and $z$ moieties in said interpolymer is equal to at least 30 wt. percent and the sum of $w$, $v$ and $y$ moieties is in the range of 0 to 70 wt. percent.

Preparation of polyolefins

The production of the polyolefins using Ziegler-Natta catalyst compositions is well known in the art. The catalyst compositions consist of a transition metal compound from Groups IV*b*, V*b* and VI*b* of the Periodic Table of the elements, particularly compounds of titanium and vanadium, which compounds are designated as primary catalysts, and organometallic reducing compounds from Groups II*a*, II*b* and III*a*, particularly organo aluminum compounds which are designated as cocatalysts. For a recent review of the prior art see Chapter 7, p. 679 ff. by G. Natta et al. in "Polymer Chemistry of Synthetic Elastomers," edited by Kennedy and Tornqvist, 1969 Interscience, N.Y.

Primary catalysts are preferably halides, oxy halides and mixtures thereof. Effective primary catalysts include vanadium trichloride, vanadium tetrachloride, vanadium oxychloride, titanium trichloride and titanium tetrachloride. Preferred is co-crystallized titanium trichloride and aluminum trichloride having the formula:

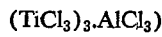

$$(TiCl_3)_3 \cdot AlCl_3)$$

made by the reduction of 3 moles of titanium tetrachloride with one mole of aluminum. It is available commercially as a finely powdered purple powder.

Suitable cocatalysts include aluminum triethyl, aluminum tri-n-propyl, aluminum triisobutyl and aluminum tri-n-hexyl. Preferred is triethyl aluminum.

Suitable solvents for dispersing the catalyst components and dissolving the monomers and reaction products may be selected from the general group of saturated acyclic and alicyclic hydrocarbons, and halogenated hydrocarbons. $C_{12}$ or lower, straight or branched chain, saturated hydrocarbons are preferred. $C_5$ to $C_9$ saturated alicyclic or aromatic hydrocarbons may be used with equal facility. Halogenated hydrocarbons having two to six carbon atoms in the molecule are also useful. Representative non-limiting examples of useful solvents are pentane, cyclopentane, hexane, cyclohexane, methyl cyclopentane, heptane, methyl cyclohexane, isooctane, benzene, toluene, mixed xylenes, cumene, dichloroethane, trichloro ethane and ortho-dichloro benzene.

Synthesis of the polymers is carried out under conditions in which air, oxygen, carbon dioxide and moisture are rigorously excluded, e.g. by blanketing the reaction under bone-dry, oxygen-free nitrogen. Catalyst and cocatalyst may be added continuously to a continuous process, or mixed with solvent in a batch reactor, preaged, and the monomers added under agitation and temperature control. Solvent to monomer volume ratio may vary from 2 to 20 parts of solvent per part of monomer. Primary transition metal catalyst may be in the range of 0.01 to 5.0 millimoles per liter of mixed reactants and solvent, preferably 0.05 to 0.5 millimole per liter. The organoaluminum cocatalyst may be prediluted with solvent and used in an amount to promote maximum conversion of monomers. Typical mole ratios of organo-aluminum cocatalyst to transition metal primary catalyst is in the range of 2 to 20 moles of cocatalyst to primary catalyst. Catalyst reactivators may be used to boost activity and hydrogen may be fed to the reactor to control molecular weight and molecular weight distribution. Temperature and pressure are generally not critical. Temperatures may be in the range of 0° C. to 100° C. and pressures may range from atmospheric to 100 p.s.i.g. Reaction time will depend on the activity of the catalyst-cocatalyst combination employed, the catalyst concentration, temperature, degree of agitation and conversion desired. In general, from 0.5 to 5 hours will give satisfactory results.

The polyolefin homopolymers and copolymers useful as one component in the synergistic mixture of polymers comprising this invention will generally have a number average molecular weight ($\overline{M}_n$) in the range of 1,000 to about 200,000. It is preferred that the $\overline{M}_n$ be in the range of 1500 to 100,000. Most preferred is a polymer having a $\overline{M}_n$ in the range of 2,000 to 60,000. Number average molecular weights cited herein were determined for polymers having a molecular weight of up to 50,000 by vapor pressure osmometry, e.g. using a Model 310A Mechrolab Osmometer. Higher molecular weights can be determined by membrane osmometry, for example.

Polymer B

The second component of the synergistic mixture of dewaxing aids is an oil-soluble polymer of alkyl methacrylate useful as a dewaxing aid, and wherein said polymer comprises a major proportion by weight of $C_{10}$ to $C_{24}$, e.g. $C_{15}$, n-alkyl groups. The molecular weight ($\overline{M}_n$) may range from about 1,000 to 200,000, preferably 3,000 to 50,000. A specific example of these polymers wherein the n-alkyl groups average about $C_{15}$, is the hereinbefore cited commercially available Acryloid 150 which is identified as a poly(pentadecyl methacrylate) having a molecular weight ($\overline{M}_n$) in the range of about 15,000 to 20,000. Acryloid 150 is sold as a clear, viscous concentrate in a solvent refined neutral mineral oil having a viscosity of 150 SUS at 100° F. The concentrate has a specific gravity of 0.9 and a viscosity of 23,000 SUS at 100° F., and contains about 50 wt. percent of active ingredient. Preparation of the polymer has been described in U.S. Pats. 2,091,627 and 2,100,993.

While the synergistic combination of Ziegler-Natta polyolefins and polymethacrylate, ester, e.g. Acryloid 150, forming the subject matter of this invention may be used to separate wax from a wide variety of petroleum stocks such as residua, middle distillates and the like, it has special application to waxy distillates and residual lubricating oil fractions such as solvent neutrals and bright stocks. These waxy lube stocks may have boiling points in the range of 400° F. to 1100° F.+, viscosities in the range of 30 to 200 SUS. at 210° F. and contain from 10 to 30 percent by weight of wax. In general, the combination functions at high efficiency in solvent dewaxing processes whether the oil is prediluted with the total amount of solvent or the solvent is added incrementally as chilling progresses.

Suitable dewaxing solvents include low-boiling hydrocarbons such as propane, propylene, butane, pentane; ketones such as acetone, methyl ethyl ketone and methyl isobutyl ketone; aromatics such as benzene and toluene; and mixtures of one or more solvents such as propylene-acetone, acetone-benzene, methylethyl ketone-methyl isobutyl ketone.

Various methods may be used to effect the addition and blending of the two-component dewaxing aid of this invention. The polyolefin component may be pre-diluted with a refined, solvent extracted, low-pour mineral oil to form a 10 to 30 wt. percent concentrate, similar to the 50 wt. percent concentrate at which Acryloid 150 is marketed. The two concentrates can then be added to the oil being dewaxed. Or, the two polymer components, (A) and (B) above, may be pre-mixed to form a single concentrate. Particularly preferred proportions are admixtures comprising 10 to 80 weight percent, preferably 15 to 50 weight percent, of the polymeric alpha-olefins; and from 90 to 20 weight percent, preferably 50 to 85 weight percent, of the methacrylate polymer. Oil concentrates of 5 to 60 wt. percent total polymer can be prepared of said admixtures.

The dewaxing aids may be added to the stock to be dewaxed as single or separate concentrates, either before or after dilution with a solvent (when used), and the dewaxing aid incorporated with the aid of heat and agitation. Suitable temperatures should in general be above the cloud point of the stock to be dewaxed. For example, temperatures in the range of 120° F. to 200° F. may be used; preferred however are temperatures in the range of 160°

F. to 200° F. Dewaxing aid concentrations within the range of 0.001 to 1.0 weight percent (calculated on a 100% active ingredient basis) of the weight of wax-containing oil can be used. Treating levels in the range 0.1 to about 0.20 weight percent are generally economically attractive.

Particularly desirable results are obtained when the combination of polymeric alpha-olefins and alkyl methacrylates comprising the dewaxing aids of the instant invention are utilized in a conventional solvent dewaxing process. For example, a solution of the aforementioned polymers, wax-containing oil and solvent may be processed by chilling in any suitable manner to a wax precipitation temperature, the wax separated by centrifugation or filtration, preferably the latter, and the oil and wax recovered by removal of solvent. The wax separations are conducted at a temperature in the range of −40° F. to 20° F., preferably from about −30° F. to about 15° F., depending on the solvent, or solvents. It is preferred, in practicing this invention, to add the mixture of dewaxing aids to the waxy stock and then combine the modified oily stock with the drawing solvent.

The following experiments and examples, including a preferred embodiment, will further illustrate the instant invention.

EXPERIMENTAL

Preparation of alpha-olefin interpolymer

An interpolymer of about 38 weight percent of n-hexene-1, about 26 weight percent of n-hexadecene-1, about 21 weight percent of n-octadecene-1 and about 15 weight percent of n-eicosene-1 was used. A typical laboratory preparation of this polymer follows:

A 500 ml. reaction flask fitted with a stirrer, thermometer, reflux condenser, gas inlet tube and external heating mantle was charged, under anhydrous conditions and in the absence of oxygen and carbon dioxide, with 0.11 grams of a Ziegler-Natta catalyst comprised of co-crystallized $(TiCl_3)_3 \cdot AlCl_3$, 75 milliliters of anhydrous mixed xylenes and 0.41 grams of aluminum triethyl co-catalyst. The mixture was stirred at room temperature for about 30 minutes under an atmosphere of oxygen-free nitrogen admitted through the gas inlet tube, the temperature raised to 75° C., and 14 gms. of the above mixture of olefins added to the flask. After addition of the olefin was complete, the reaction mixture was stirred for a further 2 hours at 75± 5° C. At the end of this time the catalyst was inactivated by the addition of about 1 ml. of isopropyl alcohol. After cooling to room temperature, the interpolymer was recovered from the reaction mixture by slow addition of the flask contents to about 750 ml. of rapidly agitated methanol. The solid interpolymer was recovered by filtration and dried at a temperature of about 60° C. under a vacuum of about 120 torr. It has a number average molecular weight of about 28,000 as determined by vapor pressure osmometry. When tested either by itself, or in combination with Acryloid 150, as a dewaxing aid on a distilled lube stock from a Texas panhandle crude, and on a residual lube stock from Louisiana crude, it showed high activity.

A larger batch of said interpolymer product made in pilot plant equipment, hereinafter identified as Interpolymer A had a number average molecular weight ($M_n$) of 14,000. It was dissolved in a low-pour neutral mineral lubricating oil at about 15 wt. percent concentration for use in the examples below.

Acryloid 150, used as the second component of the dewaxing aid of this invention was purchased from Rohm and Haas Co., Philadephia, Pa.

A waxy bright stock of Mid-East origin designated Aramco bright stock was used for all of the following examples.

INSPECTIONS ON ARAMCO BRIGHT STOCK

| | |
|---|---|
| Gravity, ° API | 25.1 |
| ASTM viscosity at 210° F. SUS | 127.8 |
| ASTM pour point, ° F. | +140 |
| Boiling point range, ° F. | 970+ |
| Wax content, wt. percent | 16 |

Dewaxing procedure: All of the experimental dewaxing runs given in Tables I and II were made as follows:

To weighed samples of Aramco bright stock preheated to 160° F., were added weighed quantities of either the oil concentrate of Interpolymer A, Acryloid 150, or a mixture of Interpolymer A and Acryloid 150 in accordance with the teachings of this invention. The solution of the dewaxing aid in the bright stock was diluted with a solvent consisting of 50 volume percent methylethyl ketone and 50 volume percent toluene at a solvent to oil weight ratio of 4 to 1.

The mixture, contained in a double-walled stainless steel beaker fitted with a U-shaped Teflon agitator which scraped the inner wall of the beaker while it was rotated at 12 r.p.m., was cooled at a rate of 4° F. per minute to a filter temperature of −10° F. The chilled slurry was then vacuum filtered through a refrigerated leaf filter maintained at −10° F. under a pressure differential of 12 inches of mercury for a given period of time. At the end of the filtration period, the filter leaf was removed and the filter-cake washed under vacuum with refrigerated solvent. The wash period was terminated by release of the vacuum when the last of the solvent disappeared into the filter cake. The oil and wax were freed of solvent by distillation.

Types and amount of dewaxing aid, inspections, and filter rates calculated in gallons per square foot per hour based on a rotary filter having a filtration time of 60 seconds and a revolution time of 2½ minutes, are given in Table I.

TABLE I.—SOLVENT DEWAXING ARAMCO BRIGHT STOCK

| | Interpolymer A [1] | | | Polypentadecylmethacrylate [2] | | Synergistic comb. [3] | |
|---|---|---|---|---|---|---|---|
| Example number | 1 | 2 | 3 | 4 | 5 | 6 | 7 |
| Wt. percent (100% active) dewaxing aid on oil | None | 0.05 | 0.10 | 0.05 | 0.10 | 0.05 | 0.10 |
| Dewaxed oil yield, weight percent | 82.9 | 83.8 | 83.7 | 83.9 | 83.0 | 83.5 | 83.1 |
| Filter rate, gal./sq. ft./hr | 2.69 | 4.25 | 4.82 | 3.55 | 3.80 | 5.4 | 6.31 |
| Oil content of wax,[4] weight percent | 11.4 | 4.0 | 3.2 | 7.9 | 3.9 | 3.7 | 2.5 |
| Pour point of dewaxed oil, ° F | +10 | +10 | +10 | +10 | +10 | +10 | +5.0 |
| Relative filtration rate | 1.00 | 1.58 | 1.79 | 1.31 | 1.41 | 2.04 | 2.35 |

[1] $M_n$ of 14,000 and consisting of about: 38 wt. percent $C_6$, 26 wt. percent $C_{16}$, 21 wt. percent $C_{18}$ and 15 wt. percent $C_{20}$ alpha monoolefins.
[2] Applied as 50 wt. percent concentrate, i.e., Acryloid 150 (Rohm and Haas Co., Philadelphia, Pa.).
[3] Synergistic combination of this invention: 25 wt. percent Interpolymer A, 75 wt. percent poly $C_{15}$ methacrylate.
[4] Slack wax oil content determined with ethylene dichloride at 0° F.

Comparison of the results obtained in Examples 6 and 7 where a mixture of polyolefin and Acryloid 150 were used with Example 1 where no dewaxing aid was added, Examples 2 and 3 where only the polyolefin was used, and Examples 4 and 5 where only the Acryloid 150 was used, demonstrates the superiority of the combination over the use of either component alone. To illustrate, 0.05 wt. percent total active ingredient, i.e. total polymer of which 1 part by weight was the polyolefin and 3 parts by weight was the methacrylate polymer (Example 6) gave a filter rate of 5.44 while 0.05 wt. percent of either polymer per se gave 4.25 (Example 2) or 3.55 (Example 4).

Table II gives the results obtained with Aramco bright stock in which the proportions by weight of each component were varied as shown.

TABLE II.—SOLVENT DEWAXING ARAMCO BRIGHT STOCK

Total dewaxing aid concentration equal to 0.10 wt. percent total polymer on oil feed

| Example number | 5 | 7 | 8 | 9 | 3 |
|---|---|---|---|---|---|
| Percent Interpolymer A[1] | 0 | 25 | 50 | 75 | 100 |
| Percent Polypentadecylmethacrylate | 100 | 75 | 50 | 25 | 0 |
| Filter rate [2] | 3.80 | 6.31 | 6.00 | 5.72 | 4.82 |

[1] Percent of each 100% active component in dweaxing aid for total of 0.1 wt. percent.
[2] Gallons per square foot per hour.

A plot of the data in Table II shows that as little as 10 percent of one component added to 90 percent of the other component gives filter rates which are greater than 100 percent of either component used alone. It will be apparent to those having skill in the dewaxing art that the optimum proportions may vary with the particular stock to be dewaxed, and the solvent used in dewaxing and that the most economical mix may be readily determined for any specific situation by the simple experiments detailed herein.

To further illustrate the invention, Example 6 can be repeated using in place of the 0.0125 wt. percent of Interpolymer A, a like amount, e.g. 0.0125 of a 50/50 wt. mixture of a homopolymer of $C_{18}$ alpha monoolefin and a homopolymer of $C_{20}$ alpha monoolefin, both homopolymers having a molecular weight ($M_n$) of about 20,000.

As still another illustration of the invention, Example 6 can be repeated using in place of the 0.0125 wt. percent of Interpolymer A, a copolymer of about 15,000 $\overline{M}_n$, and consisting of about equal molar amounts of $C_{18}$ alpha monoolefin and a $C_{20}$ alpha monoolefin.

What is claimed is:

1. In a process for the solvent dewaxing of a waxy petroleum hydrocarbon oil including the steps of dissolving the oil in a dewaxing solvent to form a solution; chilling the solution to a temperature where solid wax precipitates; separating the precipitated wax from the dewaxed oil solution; and recovering a solvent-free oil and wax; the improvement comprising incorporating into the oil prior to said chilling step in the range of from 0.001 to about 2.0 wt. percent of a synergistic mixture of oil-soluble polymeric dewaxing aids (A) and (B) wherein dewaxing aid (A) comprises (i) a mixture of two different olefin homopolymers, or (ii) an interpolymer of at least two different olefins; wherein said olefins are polymerized by Zeigler-Natta catalysis and are substantially linear alpha-monoolefins having in the range of 14 to 24 carbon atoms; or mixtures of (i) and (ii); and dewaxing aid (B) comprises homopolymers or interpolymers of n-alkyl methacrylates having in the range of 10 to 24 carbon atoms in the alkyl groups, each of said (A) and (B) polymers constituting from 10 to 90 wt. percent of the total of said polymers added to said oil and have a number average molecular weight in the range of 1,000 to 200,000.

2. The process according to claim 1 wherein said dewaxing aid (A) has a number average molecular weight in the range of 2,000 to 60,000.

3. Process according to claim 1, wherein said homopolymer of a n-alkyl methacrylate is poly(n-pentadecyl methacrylate) having a number average molecular weight in the range of 15,000 to 20,000.

4. Process according to claim 1, wherein the total of said polymeric alpha-monoolefin and said polymeric n-alkyl methacrylate added to said waxy oil is in the range of 0.01 to 1.0 wt. percent of said oil, based on 100% active material.

5. Process according to claim 1, wherein said dewaxing aid (A) also contains 0 to 70 wt. percent based on the total alpha-olefins, of alpha-olefins having in the range of 3 to 12 carbon atoms, which are interpolymerized with said $C_{14}$ to $C_{24}$ alpha-olefins.

6. Process according to claim 1, wherein said interpolymer of alpha-monoolefins comprises an interpolymer of from 0 to 70 wt. percent of n-tetradecene-1; 0 to 70 wt. percent of n-hexadecene-1; 0 to 70 wt. percent of n-octadecene-1; 0 to 70 wt. percent of n-eicosene-1 and 0 to 70 wt. percent of a $C_3$ to $C_{12}$ alpha-monolefin.

7. Process according to claim 1, wherein said interpolymer of alpha-monoolefin comprises an interpolymer of from 10 to 50 wt. percent of n-hexadecene-1; 10 to 40 wt. percent of n-octadecene-1; 5 to 30 wt. percent of n-eicosene-1; and 15 to 60 wt. percent of n-hexene-1.

8. Process according to claim 1, wherein said interpolymer of alpha-monoolefins comprises an interpolymer of 38 wt. percent of n-hexene-1; 26 wt. percent of n-hexadecene-1; 21 wt. percent of n-octadecene-1; and 15 wt. percent of n-eicosene-1.

References Cited

UNITED STATES PATENTS

| 3,355,379 | 11/1967 | Leonard | 208—33 |
| 3,393,144 | 7/1968 | Button et al. | 208—33 |
| 3,639,226 | 2/1972 | Henselman et al. | 208—33 |
| 2,798,027 | 7/1957 | Cohen | 208—38 |
| 3,458,430 | 7/1969 | Henselman et al. | 208—33 |
| 3,479,278 | 11/1969 | De Vault | 208—33 |

HERBERT LEVINE, Primary Examiner

U.S. Cl. X.R.

260—885, 897 B